(12) United States Patent
Kimura

(10) Patent No.: US 7,328,091 B2
(45) Date of Patent: Feb. 5, 2008

(54) HYBRID VEHICLE AND HYBRID VEHICLE CONTROLLING METHOD

(75) Inventor: Akihiro Kimura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 731 days.

(21) Appl. No.: 10/786,040

(22) Filed: Feb. 26, 2004

(65) Prior Publication Data

US 2004/0236483 A1    Nov. 25, 2004

(30) Foreign Application Priority Data

May 20, 2003    (JP) ............................. 2003-142695

(51) Int. Cl.
   *B60L 11/00*    (2006.01)
(52) U.S. Cl. ........................ 701/22; 318/139; 180/65.1
(58) Field of Classification Search ................ 701/22; 318/139; 180/65.1
   See application file for complete search history.

(56) References Cited

U.S. PATENT DOCUMENTS

| | | | | | |
|---|---|---|---|---|---|
| 4,335,429 | A | * | 6/1982 | Kawakatsu | ................. 701/102 |
| 5,497,070 | A | * | 3/1996 | Furutani et al. | ............... 322/23 |
| 5,806,617 | A | * | 9/1998 | Yamaguchi | ................. 180/65.2 |
| 5,923,093 | A | * | 7/1999 | Tabata et al. | ............. 290/40 C |
| 6,116,363 | A | * | 9/2000 | Frank | ........................ 180/65.2 |
| 6,315,068 | B1 | * | 11/2001 | Hoshiya et al. | ............ 180/65.2 |
| 6,328,670 | B1 | * | 12/2001 | Minowa et al. | ................. 477/5 |
| 6,484,833 | B1 | * | 11/2002 | Chhaya et al. | ............. 180/65.4 |
| 2004/0231897 | A1 | * | 11/2004 | Kimura et al. | ............. 180/65.2 |

FOREIGN PATENT DOCUMENTS

| | | |
|---|---|---|
| JP | 2000-110604 | 4/2000 |
| JP | 2000-197208 | 7/2000 |
| JP | 2000-238555 | 9/2000 |
| JP | 2002-337573 | 11/2002 |

OTHER PUBLICATIONS

Chinese language version of Chinese Office Action, No. 200410034754.5, issued Mar. 31, 2006.
English translation of Chinese Office Acion, No. 200410034754.5, issued Mar. 31, 2006.
Japanese language version of Japanese Office Action No. JP-2003-142695, issued Feb. 28, 2006.
English translation of Japanese Office Action No. JP-2003-142695, issued Feb. 28, 2006.

* cited by examiner

*Primary Examiner*—Thomas Black
*Assistant Examiner*—Marie A Weiskopf
(74) *Attorney, Agent, or Firm*—Kenyon & Kenyon LLP

(57) ABSTRACT

A procedure for calculating a tentative engine revolution speed Netmp1 that satisfies both restriction to a driving force demand for a smooth change of a driving force acting on a drive shaft in response to a driver's release of an accelerator subsequent to the driver's accelerator actuation and a discharge limit Wout of a battery. The procedure may also calculate a smoothed engine revolution speed Netmp3 for a smooth change of a revolution speed of an engine. The procedure sets the smaller between the tentative engine revolution speed Netmp1 and the smoothed engine revolution speed Netmp3 to a target revolution speed Ne* of the engine (step S116) and controls the engine and two motors with such setting.

14 Claims, 6 Drawing Sheets

HYBRID VEHICLE AND HYBRID VEHICLE CONTROLLING METHOD

BACKGROUND OF THE INVENTION

1. Field of the Invention

The present invention relates to a hybrid vehicle and a method of controlling the hybrid vehicle. More specifically, the invention relates to a hybrid vehicle that outputs power to a drive shaft linked with drive wheels, and a method of controlling the same.

2. Description of the Prior Art

A proposed hybrid vehicle has an engine, a planetary gear mechanism that includes a carrier connected with a crankshaft of the engine and a ring gear connected with a drive shaft, which is mechanically linked with an axle, a first motor that inputs and outputs power from and to a sun gear of the planetary gear mechanism, a second motor that inputs and outputs power from and to the drive shaft, and a battery that transmits electric power to and from the first motor and the second motor (for example, see Patent Laid-Open Gazette No. 2000-197208).

In this known hybrid vehicle, in response to a driver's step-off action of an accelerator pedal subsequent to the driver's step-on action of the accelerator pedal, the second motor is under regenerative control to output a smoothed driving force, which is obtained by smoothing a driving force demand by the step-off action, to the drive shaft. This relieves the potential shock of torque to the drive shaft, due to a shift from the accelerator-on state to the accelerator-off state. The smoothing operation of the driving force demand corresponding to the driver's step-off action of the accelerator pedal, however, may not immediately change the status of the second motor to the regenerative state but may temporarily keep the second motor in its driving state. This may result in discharge of the battery exceeding its discharge limit in some driving conditions of the first motor.

SUMMARY OF THE INVENTION

The object of the present invention is to provide a hybrid vehicle and a hybrid vehicle controlling method, which output the driving force corresponding to the driving force demand to the drive shaft under restriction of the discharge limit of the electric accumulator, for example, a battery, in response to the driver's accelerator-off action subsequent to the driver's accelerator-on action.

In order to achieve the above object, a hybrid vehicle and a hybrid vehicle controlling method are constructed as follows.

A hybrid vehicle of the present invention is a vehicle that outputs power to a drive shaft linked with drive wheels, the hybrid vehicle including: an internal combustion engine; an electric power-dynamic power input-output module that transmits at least part of power from the internal combustion engine to the drive shaft through input and output of electric power and dynamic power; a motor that inputs and outputs power from and to the drive shaft; an electric accumulator that transmits electric power to and from the electric power-dynamic power input-output module and the motor; and a controller that, in response to a driver's accelerator-off action to require a driving force demand to the drive shaft subsequent to the driver's accelerator-on action, sets a specific drive point of the internal combustion engine to attain output of a driving force corresponding to the driving force demand to the drive shaft, based on the driving force demand and a discharge limit of the electric accumulator, and controls the internal combustion engine, the electric power-dynamic power input-output module, and the motor to drive the internal combustion engine at the preset specific drive point and to ensure output of the driving force corresponding to the driving force demand to the drive shaft.

In response to the driver's accelerator-off action to require a driving force demand to the drive shaft subsequent to the driver's accelerator-on action, the hybrid vehicle of the invention sets a specific drive point of the internal combustion engine to attain output of a driving force corresponding to the driving force demand to the drive shaft, based on the driving force demand and a discharge limit of the electric accumulator. The hybrid vehicle controls the internal combustion engine, the electric power-dynamic power input-output module, and the motor to drive the internal combustion engine at the preset specific drive point and to ensure output of the driving force corresponding to the driving force demand to the drive shaft. Here the electric power-dynamic power input-output module transmits at least part of power from the internal combustion engine to the drive shaft through input and output of electric power and dynamic power, and the motor inputs and outputs power from and to the drive shaft. This arrangement thus ensures output of the driving force corresponding to the driving force demand to the drive shaft under restriction of the discharge limit of the electric accumulator. The terminology 'the driver's accelerator-off action to require the driving force demand to the drive shaft subsequent to the driver's accelerator-on action' means that a negative driving force is demanded after requirement of a positive driving force.

In accordance with one preferable application of the invention, the controller in the hybrid vehicle calculates a first revolution speed of the internal combustion engine from a smoothed driving force, which is obtained by smoothing the driving force demand, and the discharge limit of the electric accumulator, and sets the calculated first revolution speed to a target revolution speed of the internal combustion engine at the specific drive point. This arrangement ensures a smoother output of the driving force corresponding to the driving force demand to the drive shaft under restriction of the discharge limit of the electric accumulator. In this application, one preferable procedure sets the smaller between the first revolution speed and a second revolution speed to the target revolution speed of the internal combustion engine at the specific drive point, where the second revolution speed is obtained by smoothing a revolution speed of the internal combustion engine calculated from the driving force demand. This arrangement attains a smooth change of the revolution speed of the internal combustion engine under restriction of the discharge limit of the electric accumulator.

In one preferable embodiment of the above application that sets the first revolution speed to the target revolution speed of the internal combustion engine at the specific drive point, the controller in the hybrid vehicle of the invention sets the first revolution speed calculated from a first driving force, which is transmitted to the drive shaft through input and output of power from and to the electric power-dynamic power input-output module, to the target revolution speed of the internal combustion engine at the specific drive point, where the first driving force is obtained according to a specific relation that a sum of the first driving force and a second driving force, which is input and output between the motor and the drive shaft, is equal to the smoothed driving force obtained by smoothing the driving force demand and according to another specific relation that a sum of a first electric power input from and output to the electric power-dynamic power input-output module and a second electric power input from and output to the motor is equal to the discharge limit of the electric accumulator. This arrangement sets the revolution speed that satisfies both the smoothed driving force, which is obtained by smoothing the driving force demand, and the discharge limit of the electric accumulator, to the target revolution speed of the internal combustion engine at the specific drive point, and controls operations of the internal combustion engine. In this embodiment, one preferable procedure substitutes a power input from and output to the electric power-dynamic power input-output module, which is calculated from the first driving force, into a target power of a relational expression, reversely calculates the relational expression to specify a target revolution speed, and sets the specified target revolution speed to the first revolution speed of the internal combustion engine, where the relational expression determines a target power to be input from and output to the electric power-dynamic power input-output module in feedback control of the electric power-dynamic power input-output module with the setting of the target revolution speed of the internal combustion engine.

In another preferable embodiment of the above application that sets the first revolution speed to the target revolution speed of the internal combustion engine at the specific drive point, the controller in the hybrid vehicle of the invention drives and controls the electric power-dynamic power input-output module under a driving condition specified to drive the internal combustion engine at the preset specific drive point, while driving and controlling the motor to output a specific driving force to the drive shaft. Here the specific driving force corresponds to a difference between a driving force applied to the drive shaft by the actuation and the control of the electric power-dynamic power input-output module and the smoothed driving force obtained by smoothing the driving force demand in response to the driver's accelerator-off action. This arrangement ensures output of the smoothed driving force, which is obtained by smoothing the driving force demand, to the drive shaft. In this embodiment, one preferable procedure drives and controls the motor under restriction of the discharge limit of the electric accumulator. This arrangement ensures output of the smoothed driving force, which is obtained by smoothing the driving force demand, to the drive shaft under restriction of the discharge limit of the electric accumulator.

In another preferable application of the present invention, the electric power-dynamic power input-output module includes: a three-shaft power input-output assembly that is connected with three shafts, that is, an output shaft of the internal combustion engine, the drive shaft, and a third shaft, and specifies input and output of power from and to one residual shaft among the three shafts, based on powers input from and output to two shafts among the three shafts; and a generator that inputs and outputs power from and to the third shaft. In still another preferable application, the electric power-dynamic power input-output module may be a pair-rotor motor, which includes a first rotor linked with an output shaft of the internal combustion engine and a second rotor linked with the drive shaft and outputs at least part of the power from the internal combustion engine to the drive shaft accompanied with input and output of electric power generated through an electromagnetic interaction between the first rotor and the second rotor.

A hybrid vehicle controlling method of the present invention is a method for controlling a hybrid vehicle, the hybrid vehicle including: an internal combustion engine; an electric power-dynamic power input-output module that transmits at least part of power from the internal combustion engine to a drive shaft liked with drive wheels through input and output of electric power and dynamic power; a motor that inputs and outputs power from and to the drive shaft; and an electric accumulator that transmits electric power to and from the electric power-dynamic power input-output module and the motor, the hybrid vehicle controlling method including the steps of: (a) in response to a driver's accelerator-off action to require a driving force demand to the drive shaft subsequent to the driver's accelerator-on action, setting a specific drive point of the internal combustion engine to attain output of a driving force corresponding to the driving force demand to the drive shaft, based on the driving force demand and a discharge limit of the electric accumulator; and (b) controlling the internal combustion engine, the electric power-dynamic power input-output module, and the motor to drive the internal combustion engine at the preset specific drive point and to ensure output of the driving force corresponding to the driving force demand to the drive shaft.

In accordance with one preferable application of the invention, the step (a) calculates a first revolution speed of the internal combustion engine from a smoothed driving force, which is obtained by smoothing the driving force demand, and the discharge limit of the electric accumulator, and sets the calculated first revolution speed to a target revolution speed of the internal combustion engine at the specific drive point. In one preferable embodiment of this application, the step (a) sets the smaller between the first revolution speed and a second revolution speed to the target revolution speed of the internal combustion engine at the specific drive point, where the second revolution speed is obtained by smoothing a revolution speed of the internal combustion engine calculated from the driving force demand.

In another preferable embodiment of the above application, the step (a) sets the first revolution speed calculated from a first driving force, which is transmitted to the drive shaft through input and output of power from and to the electric power-dynamic power input-output module, to the target revolution speed of the internal combustion engine at the specific drive point, where the first driving force is obtained according to a specific relation that a sum of the first driving force and a second driving force, which is input and output between the motor and the drive shaft, is equal to the smoothed driving force obtained by smoothing the driving force demand and according to another specific relation that a sum of a first electric power input from and output to the electric power-dynamic power input-output module and a second electric power input from and output to the motor is equal to the discharge limit of the electric accumulator. In this embodiment, the step (a) may substitute a power input from and output to the electric power-dynamic power input-output module, which is calculated from the first driving force, into a target power of a relational expression, reversely calculates the relational expression to specify a target revolution speed, and set the specified target revolution speed to the first revolution speed of the internal combustion engine, where the relational expression determines a target power to be input from and output to the electric power-dynamic power input-output module in feedback control of the electric power-dynamic power input-output module with the setting of the target revolution speed of the internal combustion engine.

In still another preferable embodiment of the above application, the step (b) drives and controls the electric power-dynamic power input-output module under a driving condition specified to drive the internal combustion engine at the preset specific drive point, while driving and controlling the motor to output a specific driving force to the drive shaft, where the specific driving force corresponds to a difference between a driving force applied to the drive shaft by the actuation and the control of the electric power-dynamic power input-output module and the smoothed driving force obtained by smoothing the driving force demand in response to the driver's accelerator-off action. In this embodiment, the step (b) may drive and control the motor under restriction of the discharge limit of the electric accumulator.

DESCRIPTION OF THE PREFERRED EMBODIMENTS

Figure 1:
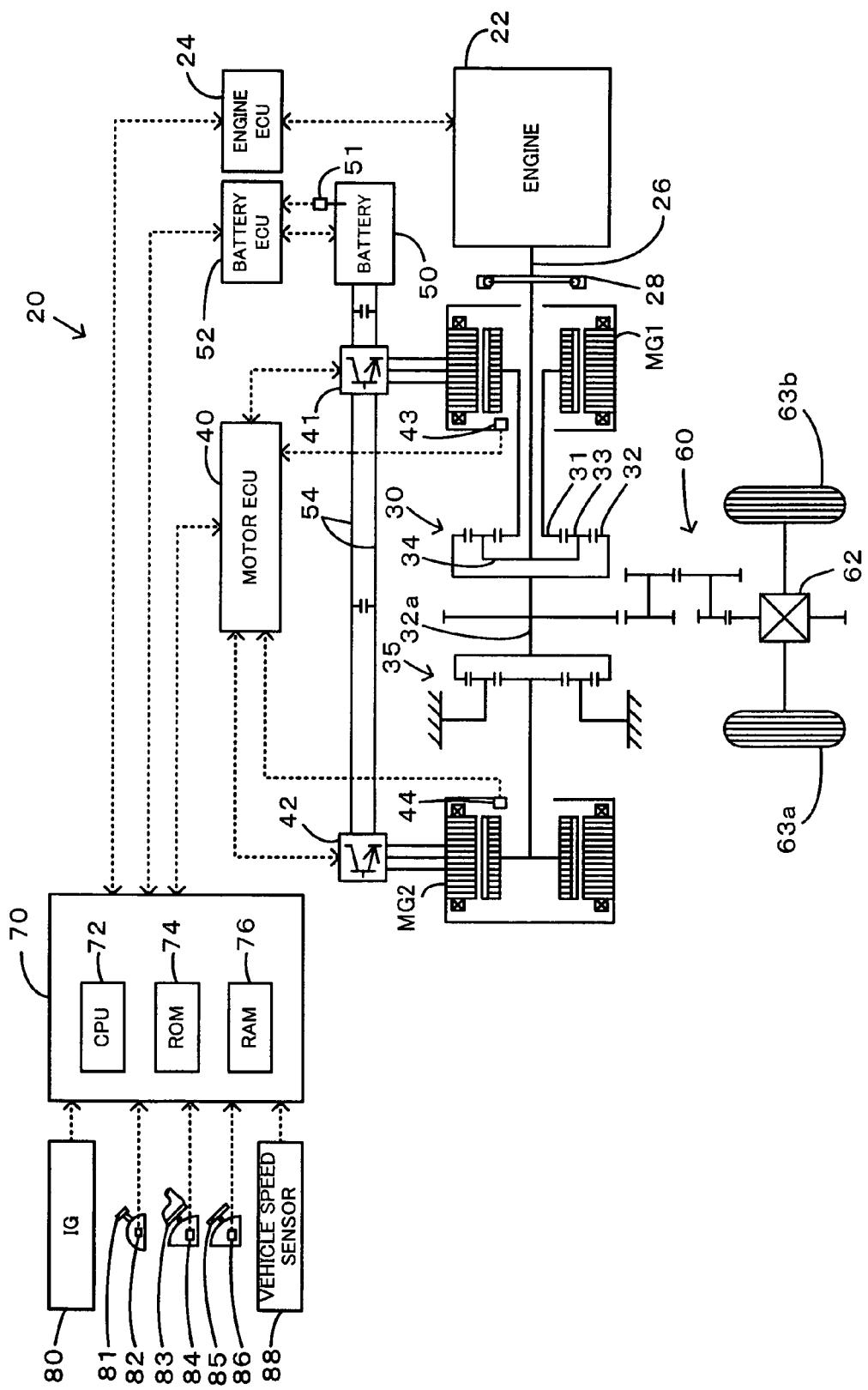
FIG. 1 schematically illustrates the construction of a hybrid vehicle 20 in one embodiment of the invention.

One mode of carrying out the invention is discussed below as a preferred embodiment. FIG. 1 schematically illustrates the construction of a hybrid vehicle 20 with a power output apparatus mounted thereon in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution integration mechanism 30 has a sun gear or external gear 31, a ring gear or internal gear 32 that is arranged concentrically with the sun gear 31, multiple pinion gears 33 that engage with both the sun gear 31 and the ring gear 32, and a carrier 34 that holds the multiple pinion gears 33 to allow their revolutions and rotations on their axes. The power distribution integration mechanism 30 is constructed as a planetary gear mechanism that has differential motions with the sun gear 31, the ring gear 32, and the carrier 34 as rotating elements. In the power distribution integration mechanism 30, the carrier 34 is linked with the crankshaft 26 of the engine 22, the sun gear 31 is linked with the motor MG1, and the ring gear 32 is linked with the reduction gear 35 via the ring gear shaft 32a. When the motor MG1 functions as an electric generator, the power output from the engine 22 and transmitted through the carrier 34 is distributed to the sun gear 31 and the ring gear 32 at their gear ratio. When the motor MG1 functions as an electric motor, on the other hand, the power output from the engine 22 and transmitted through the carrier 34 is integrated with the power output from the motor MG1 and transmitted through the sun gear 31 and is output to the ring gear 32. The power output to the ring gear 32 is eventually transmitted to drive wheels 63a and 63b of the vehicle via the ring gear shaft 32a, a gear mechanism 60, and a differential gear 62.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and an input-output port and a communication port (not shown). The hybrid electronic control unit 70 receives input of various data and signals via the input port. The input includes, for example, an ignition signal from an ignition switch 80, a gearshift position SP transmitted from a gearshift position sensor 82 that detects the operating position of a gearshift lever 81, an accelerator opening Acc transmitted from an accelerator pedal position sensor 84 that measures the step-on amount of an accelerator pedal 83, a brake pedal position BP transmitted from a brake pedal position sensor 86 that measures the step-on amount of a brake pedal 85, and a vehicle speed V measured by a vehicle speed sensor 88. As mentioned previously, the hybrid electronic control unit 70 connects with the engine ECU 24, the motor ECU 40, and the battery ECU 52 via the communication port and transmits various control signals and data to and from the engine ECU 24, the motor ECU 40, and the battery ECU 52.

The hybrid vehicle 20 of the embodiment thus constructed calculates a torque demand to be output to the ring gear shaft 32$a$ functioning as the drive shaft, based on observed values of a vehicle speed V and an accelerator opening Acc, which corresponds to a driver's step-on amount of the accelerator pedal 83. The engine 22 and the motors MG1 and MG2 are subjected to operation control to output a required level of power corresponding to the calculated torque demand to the ring gear shaft 32$a$. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32$a$. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32$a$, simultaneously with charge or discharge of the battery 50. The motor drive mode stops the operations of the engine 22 and drives and controls the motor MG2 to output a quantity of power equivalent to the required level of power to the ring gear shaft 32$a$.

Figure 2:
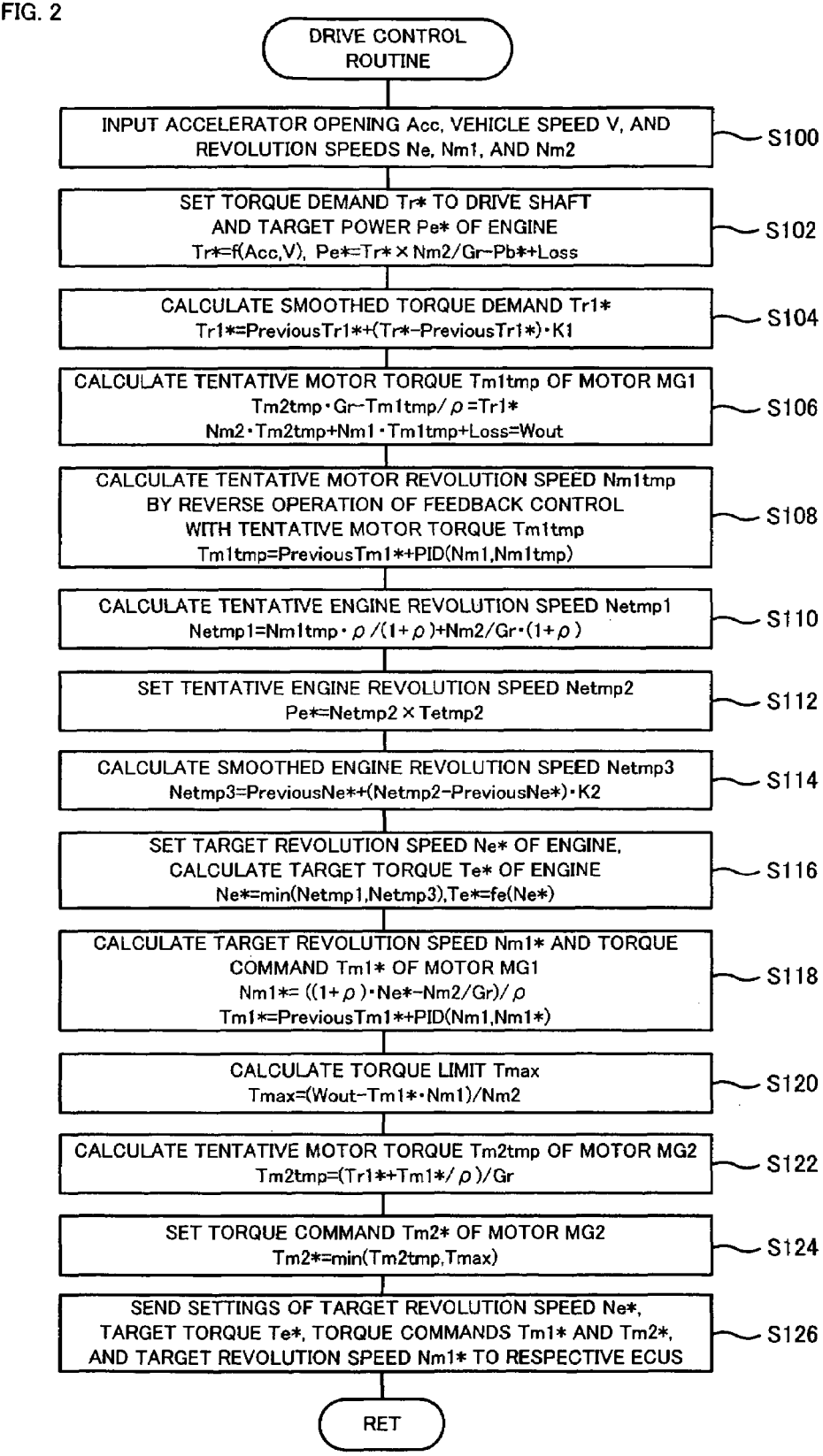
FIG. 2 is a flowchart showing a drive control routine executed by the hybrid electronic control unit 70 in the hybrid vehicle 20 of the embodiment.

The following describes the operations of the hybrid vehicle 20 of the embodiment constructed as discussed above, especially an operation when the driver steps off the accelerator pedal 83 during a run of the hybrid vehicle 20 with activation of the accelerator pedal 83. FIG. 2 is a flowchart showing a drive control routine, which is executed by the hybrid electronic control unit 70 in the hybrid vehicle 20 of the embodiment. This routine is repeatedly executed at preset time intervals (for example, at every 8 msec) since the driver's step-off action of the accelerator pedal 83. The driver's step-off action of the accelerator pedal 83 may be specified, for example, based on a difference between the previous accelerator opening Acc and the current accelerator opening Acc detected by the accelerator pedal position sensor 84.

When the program enters the drive control routine, the CPU 72 of the hybrid electronic control unit 70 first inputs required data for control, which include the accelerator opening Acc representing the step-on amount of the accelerator pedal 83, the vehicle speed V sent from the vehicle speed sensor 88, a revolution speed Ne of the crankshaft 26 of the engine 22, and revolution speeds Nm1 and Nm2 of the motors MG1 and MG2 (step S100). The revolution speeds Nm1 and Nm2 of the motors MG1 and MG2 are computed from rotational positions of rotors in the motors MG1 and MG2 detected by rotational position detection sensors 43 and 44 and are input from the motor ECU 40 into the hybrid electronic control unit 70 via communication The revolution speed Ne of the engine 22 is calculated from the revolution speed Nm1 of the motor MG1, a revolution speed Nr of the ring gear shaft 32$a$, and a gear ratio ρ (the number of teeth of the sun gear/the number of teeth of the ring gear) of the power distribution integration mechanism 30. Here the revolution speed Nr of the ring gear shaft 32$a$ is obtained by dividing the revolution speed Nm2 of the motor MG2 by a gear ratio Gr (the revolution speed of the motor MG2/the revolution speed of the ring gear shaft 32$a$) of the reduction gear 35. Another available structure may attach a revolution speed sensor to the crankshaft 26 of the engine 22 and directly measure the revolution speed Ne of the engine 22.

Figure 3:
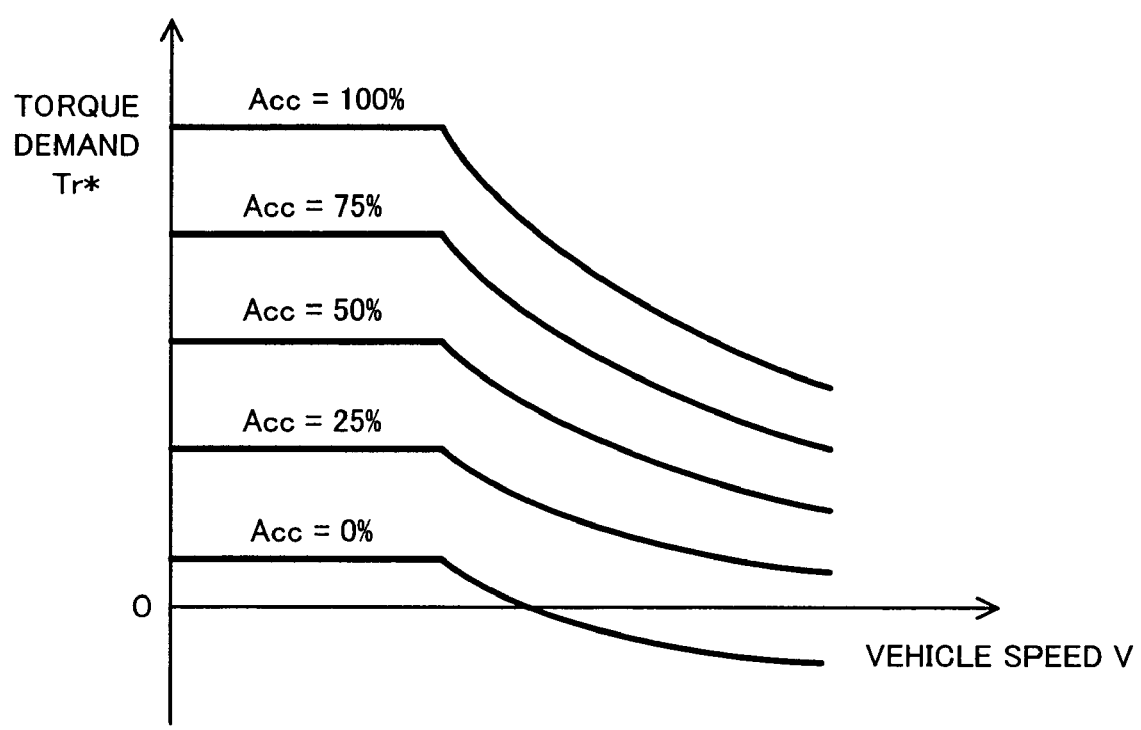
FIG. 3 shows one example of the torque demand setting map to the accelerator opening Acc and the vehicle speed V.

After the input of the required data, the CPU 72 sets a torque demand or required torque Tr*, which is to be output to the ring gear shaft 32$a$ functioning as the drive shaft, and a target power Pe*, which is to be output from the engine 22, based on the input accelerator opening Acc and vehicle speed V (step S102). In the structure of this embodiment, a mapping of the accelerator opening Acc and the vehicle speed V to the torque demand Tr* is specified in advance and is stored in the form of a torque demand setting map into the ROM 74. The procedure of this embodiment reads and sets the value of the torque demand Tr* corresponding to the input data of the accelerator opening Acc and the vehicle speed V from the torque demand setting map stored in the ROM 74. FIG. 3 shows one example of the torque demand setting map. The target power Pe* of the engine 22 is given as the sum of the product of the torque demand Tr* and a revolution speed Nr of the ring gear shaft 32$a$, a charge-discharge demand or required charge-discharge quantity Pb* of the battery 50, and a potential loss. Here the charge-discharge demand Pb* of the battery 50 is set according to a state of charge (SOC) of the battery 50.

The CPU 72 subsequently makes the setting of the torque demand Tr* to the ring gear shaft 32$a$ subjected to a smoothing process to calculate a smoothed torque demand Tr1* according to Equation (1) given below (step S104). In Equation (1), 'K1' denotes a constant set in a range of a value '0' to a value '1' to ensure a smooth change of the torque applied to the ring gear shaft 32$a$. The term 'PreviousTr1*' represents a smoothed torque demand, which was calculated at step S104 in the previous cycle of the drive control routine.

$$Tr1^* = \text{Previous}Tr1^* + (Tr^* - \text{Previous}Tr1^*) \cdot K1 \qquad (1)$$

Figure 4:
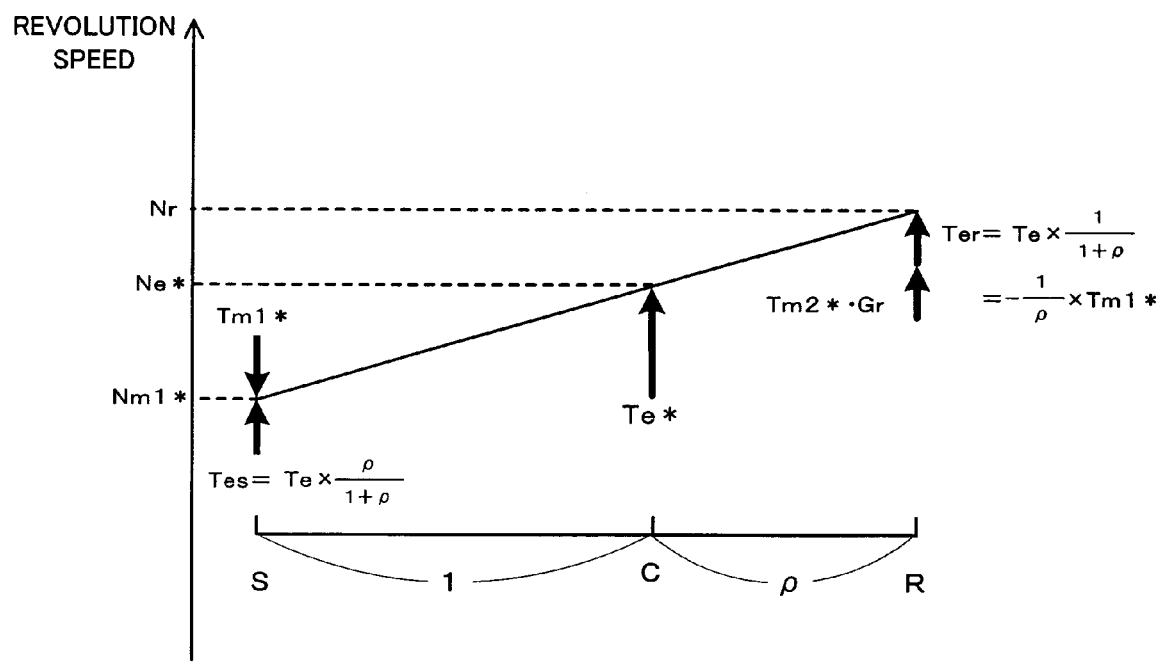
FIG. 4 is an alignment chart showing a dynamic relation between the revolution speed and the torque of rotational elements in the power distribution integration mechanism 30.

The CPU 72 then calculates a tentative motor torque Tm1tmp of the motor MG1 from the calculation result of the smoothed torque demand Tr1* and a discharge limit Wout of the battery 50 according to Equations (2) and (3) given below (step S106). Equation (2) shows a specific relation that the summation of the torques output from the motors MG1 and MG2 and transmitted to the ring gear shaft 32a or the drive shaft is equal to the smoothed torque demand Tr1*. Equation (3) shows another specific relation that the sum of the summation of electric powers input into and output from the motors MG1 and MG2 and a potential loss is equal to the discharge limit Wout of the battery 50. The discharge limit Wout of the battery 50 is specified according to an observed battery temperature Tb and the state of charge (SOC) of the battery 50. FIG. 4 is an alignment chart showing a dynamic relation between the revolution speed and the torque of rotational elements in the power distribution integration mechanism 30. In the alignment chart of FIG. 4, two thick arrows on an axis R respectively represent a torque acting on the ring gear shaft 32a as a torque Te* output from the engine 22 is transmitted via the power distribution integration mechanism 30 while the engine 22 is steadily driven at a specific drive point defined by a target torque Te* and a target revolution speed Ne*, and a torque output from the motor MG2 and transmitted to the ring gear shaft 32a via the reduction gear 35. The left side of Equation (2) accordingly represents the sum of the torque transmitted to the ring gear shaft 32a via the reduction gear 35 when a torque Tm2tmp is output from the motor MG2 and the torque transmitted from the engine 22 to the ring gear shaft 32a via the power distribution integration mechanism 30 when a torque Tm1tmp is output from the motor MG1.

$$Tm2tmp \cdot Gr - Tm1tmp/\rho = Tr1* \qquad (2)$$

$$Nm2 \cdot Tm2tmp + Nm1 \cdot Tm1tmp + Loss = Wout \qquad (3)$$

The CPU 72 subsequently calculates a tentative motor revolution speed Nm1tmp by substituting the calculated tentative motor torque Tm1tmp in place of a torque command Tm1* into Equation (4) given below and reversely calculating Equation (4) (step S108). Equation (4) determines a torque to be output from the motor MG1 (torque command Tm1*) in feedback control to rotate the motor MG1 at a setting of a target revolution speed Nm1*, based on a difference between the target revolution speed Nm1* and an observed current revolution speed Nm1 of the motor MG1. The relation between the tentative motor torque Tm1tmp and the tentative motor revolution speed Nm1tmp is given below as Equation (5). The function PID in Equations (4) and (5) has a proportional term, an integral term, and a differential term for feedback control. The term 'PreviousTm1*' represents a previous torque command Tm1* of the motor MG1, which was set at step S118 (discussed later) in the previous cycle of the drive control routine.

$$Tm1* = PreviousTm1* + PID(Nm1, Nm1*) \qquad (4)$$

$$Tm1tmp = PreviousTm1* + PID(Nm1, Nm1tmp) \qquad (5)$$

After calculation of the tentative motor revolution speed Nm1tmp, the CPU 72 calculates a tentative engine revolution speed Netmp1 from the calculated tentative motor revolution speed Nm1tmp, the observed current revolution speed Nr (=Nm2/Gr) of the ring gear shaft 32a, and the gear ratio ρ of the power distribution integration mechanism 30 according to Equation (6) given below (step S110). The processing of steps S104 to S110 results in determining the tentative engine revolution speed Netmp1 as the revolution speed of the engine 22 that satisfies both the restriction to the torque demand Tr* for a smooth change of the torque acting of the ring gear shaft 32a or the drive shaft (this corresponds to the smoothing process of the torque demand Tr* at step S104) and the discharge limit Wout of the battery 50.

$$Netmp1 = Nm1tmp \cdot \rho/(1+\rho) + (Nm2/Gr)/(1+\rho) \qquad (6)$$

The CPU 72 then sets the revolution speed of an efficient drive point of the engine 22, which is selected among drive points (points defined by the combinations of the torque and the revolution speed) fulfilling the target power Pe* of the engine 22 set at step S102, to a tentative engine revolution speed Netmp2 (step S112). The CPU 72 subsequently makes the setting of the tentative engine revolution speed Netmp2 subjected to a smoothing process to calculate a smoothed engine revolution speed Netmp3 according to Equation (7) given below (step S114). In Equation (7), 'K2' denotes a constant set in a range of a value '0' to a value '1' to ensure a smooth change of the revolution speed of the engine 22. The term 'PreviousNe*' represents a target revolution speed Ne* of the engine 22, which was set at step S116 (discussed later) in the previous cycle of the drive control routine.

$$Netmp3 = PreviousNe* + (Netmp2 - PreviousNe*) \cdot K2 \qquad (7)$$

The CPU 72 sets the smaller between the tentative engine revolution speed Netmp1 calculated at step S110 and the smoothed engine revolution speed Netmp3 calculated at step S114 to a target revolution speed Ne* of the engine 22, and divides the target power Pe* set at step S102 by the setting of the target revolution speed Ne* to calculate a target torque Te* of the engine 22 (step S116). As mentioned above, the tentative engine revolution speed Netmp1 and the smoothed engine revolution speed Netmp3 respectively represent the revolution speed that satisfies both the restriction to the torque demand Tr* for a smooth change of the torque acting of the ring gear shaft 32a and the discharge limit Wout of the battery 50, and the revolution speed for a smooth change of the revolution speed of the engine 22. Setting the smaller between these two revolution speeds to the target revolution speed Ne* of the engine 22 ensures a relatively smooth change of the revolution speed of the engine 22, while attaining a smooth change of the torque applied to the ring gear shaft 32a or the drive shaft under the restriction of the discharge limit Wout of the battery 50.

The CPU 72 then calculates a target revolution speed Nm1* of the motor MG1 from the setting of the target revolution speed Ne* of the engine 22, the revolution speed Nr (=Nm2/Gr) of the ring gear shaft 32a, and the gear ratio ρ of the power distribution integration mechanism 30 according to Equation (8) given below, while calculating a torque command Tm1* of the motor MG1 from the calculated target revolution speed Nm1* and the observed current revolution speed Nm1 of the motor MG1 according to Equation (4) given above (step S118).

$$Nm1* = Ne* \cdot (1+\rho)/\rho - (Nm2/Gr)/\rho \qquad (8)$$

The CPU 72 subtracts a power consumption (power generation) of the motor MG1 from the discharge limit Wout of the battery 50 and divides the result of the subtraction by the observed current revolution speed Nm2 of the motor MG2 to specify an upper torque limit Tmax to be output from the motor MG2 according to Equation (9) given below (step S120). Here the power consumption of the motor MG1 is obtained by multiplying the calculated torque command Tm1* of the motor MG1 by the observed current revolution speed Nm1 of the motor MG1. The CPU 72 subsequently calculates a tentative motor torque Tm2tmp to be output from the motor MG2 from the smoothed torque demand Tr1*, which was obtained by smoothing the torque demand Tr* to the ring gear shaft 32a at step S104, the torque command Tm1* of the motor MG1, the gear ratio ρ of the power distribution integration mechanism 30, and the gear ratio Gr of the reduction gear 35 according to Equation (10) given below (step S122). The CPU 72 sets the smaller between the calculated torque limit Tmax and the calculated tentative motor torque Tm2tmp to a torque command Tm2* of the motor MG2 (step S124). This process specifies the torque command Tm2* of the motor MG2 as the required torque to output the smoothed torque demand Tr1*, which attains a smooth change of the driver's torque demand Tr*, to the ring gear shaft 32a under restriction of the discharge limit Wout of the battery 50.

$$Tmax = (Wout - Tm1^* * Nm1)/Nm2 \qquad (9)$$

$$Tm2tmp = (Tr1^* + Tm1^*/\rho)/Gr \qquad (10)$$

On completion of the setting of the target revolution speed Ne* and the target torque Te* of the engine 22, the target revolution speed Nm1* and the torque command Tm1* of the motor MG1, and the torque command Tm2* of the motor MG2, the CPU 72 sends the settings of the target revolution speed Ne* and the target torque Te* of the engine 22 to the engine ECU 24, while sending the settings of the target revolution speed Nm1* and the torque command Tm1* of the motor MG1 and the torque command Tm2* of the motor MG2 to the motor ECU 40 (step S126). The program then exits from this drive control routine. The engine ECU 24 receives the target revolution speed Ne* and the target torque Te* and carries out operation control of the engine 22 including fuel injection control and ignition control to make the engine 22 driven at a specific drive point defined by the target revolution speed Ne* and the target torque Te*. The motor ECU 40 receives the target revolution speed Nm1*, the torque command Tm1*, and the torque command Tm2* and carries out switching control of the switching elements included in the inverters 41 and 42 to make the motor MG1 driven with the torque command Tm1* and the motor MG2 driven with the torque command Tm2*.

In the hybrid vehicle 20 of the embodiment discussed above, when the driver steps off the accelerator pedal 83 to change the torque demand Tr* from a positive level to a negative level, the smaller between the revolution speed that satisfies both the restriction to the torque demand Tr* for a smooth change of the torque acting of the ring gear shaft 32a and the discharge limit Wout of the battery 50 (the tentative engine revolution speed Netmp1) and the revolution speed for a smooth change of the revolution speed of the engine 22 (the smoothed engine revolution speed Netmp3) is set to the target revolution speed Ne* of the engine 22. The engine 22 and the motors MG1 and MG2 are then controlled with such setting. In response to the driver's step-off action of the accelerator pedal 83, this arrangement ensures a relatively smooth change of the revolution speed of the engine 22, while attaining a smooth change of the torque applied to the ring gear shaft 32a under restriction of the charge limit Wout of the battery 50.

The hybrid vehicle 20 of the embodiment sets the smaller between the tentative engine revolution speed Netmp1 and the smoothed engine revolution speed Netmp3 to the target revolution speed Ne* of the engine 22 and controls the engine 22 and the motors MG1 and MG2 with such setting. One possible modification may attach greater importance to fulfillment of the torque demand Tr* than the smooth change of the revolution speed of the engine 22, in response to the driver's step-off action of the accelerator pedal 83. The procedure of this modification sets the revolution speed that satisfies both the restriction to the torque demand Tr* for a smooth change of the torque acting of the ring gear shaft 32a and the discharge limit Wout of the battery 50 to the target revolution speed Ne* of the engine 22 and controls the engine 22 and the motors MG1 and MG2 with such setting.

The hybrid vehicle 20 of the embodiment substitutes the tentative motor torque Tm1tmp into the equation of PID feedback control and reversely calculates the equation to determine the tentative motor revolution speed Nm1tmp, in the process of calculation of the tentative engine revolution speed Netmp1. The feedback control is not restricted to the PID control, but may be PI control without a differential term or proportional control without an integral term.

Figure 5:
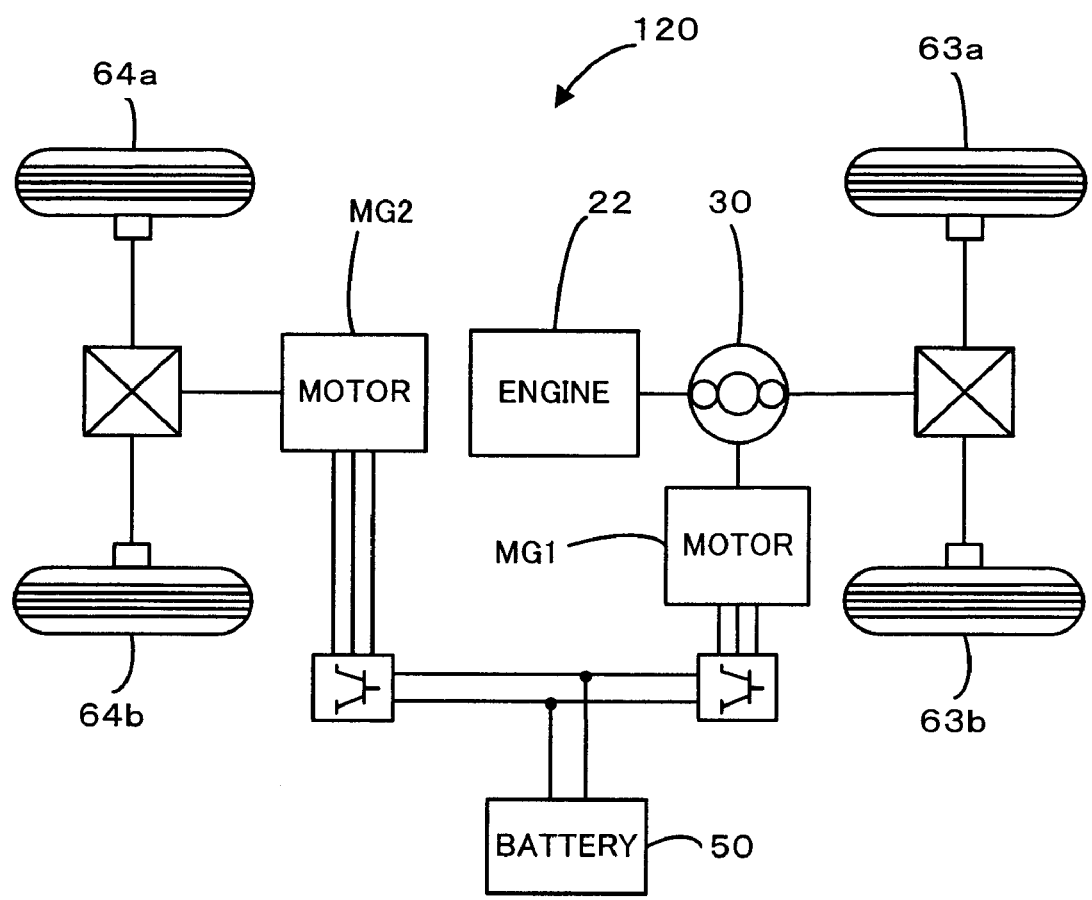
FIG. 5 schematically illustrates the construction of a hybrid vehicle 120 in one modified example.

In the hybrid vehicle 20 of the embodiment, the power of the motor MG2 is subjected to gear change by the reduction gear 35 and is output to the ring gear shaft 32a. In one possible modification shown as a hybrid vehicle 120 of FIG. 5, the power of the motor MG2 may be output to another axle (that is, an axle linked with wheels 64a and 64b), which is different from an axle connected with the ring gear shaft 32a (that is, an axle linked with the drive wheels 63a and 63b).

Figure 6:
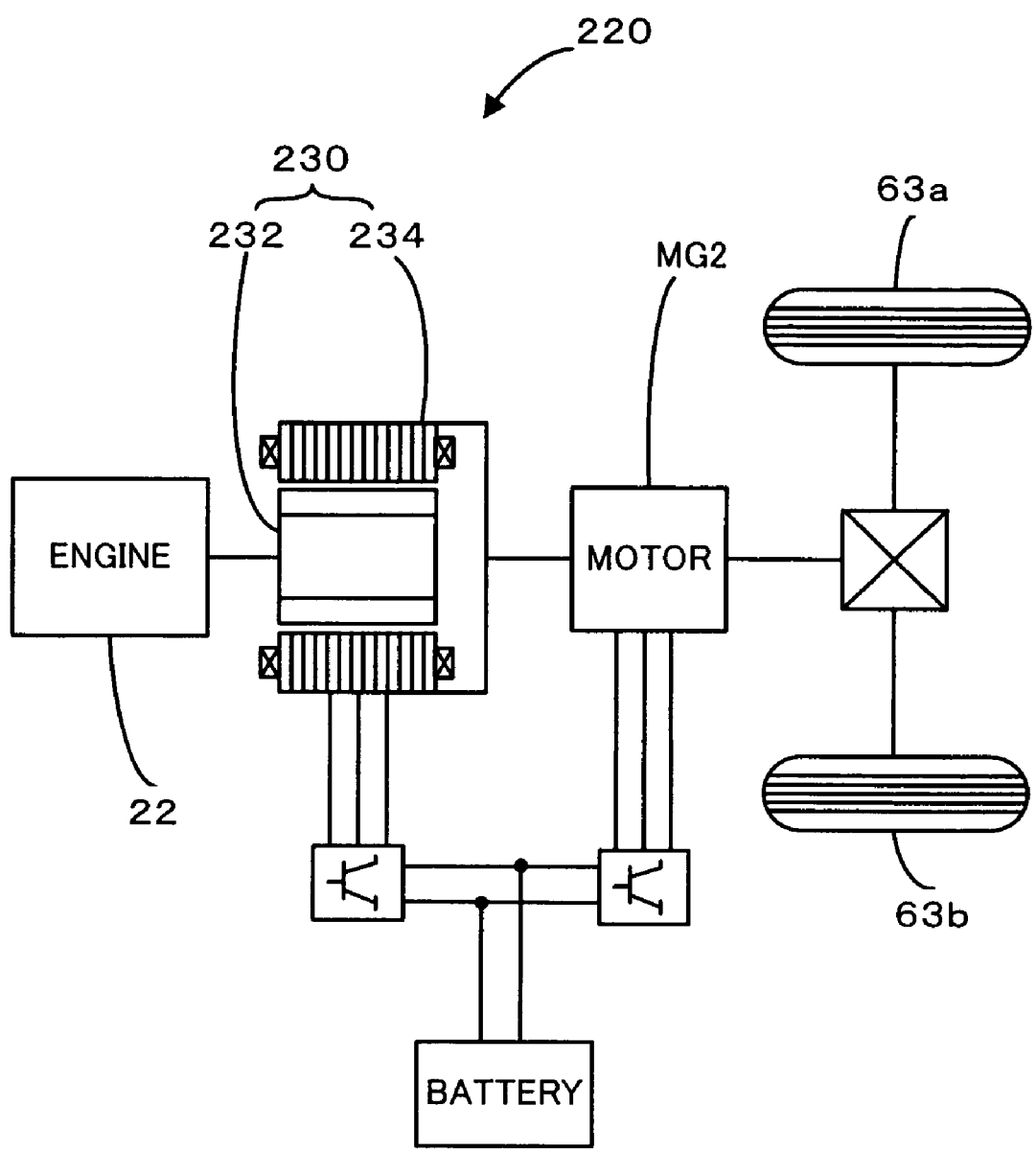
FIG. 6 schematically illustrates the construction of a hybrid vehicle 220 in another modified example.

In the hybrid vehicle 20 of the embodiment, the power of the engine 22 is output via the power distribution integration mechanism 30 to the ring gear shaft 32a functioning as the drive shaft linked with the drive wheels 63a and 63b. In another possible modification of FIG. 6, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

The above embodiment is to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

What is claimed is:

1. A hybrid vehicle that outputs power to a drive shaft linked with drive wheels, said hybrid vehicle comprising:
   an internal combustion engine;
   an electric power-dynamic power input-output module that transmits at least part of power from said internal combustion engine to said drive shaft through input and output of electric power and dynamic power;
   a motor that inputs and outputs power from and to said drive shaft;
   an electric accumulator that transmits electric power to and from said electric power-dynamic power input-output module and said motor; and
   a controller that, in response to a driver's release of the accelerator requires a driving force demand to said drive shaft subsequent to the driver's actuation of the accelerator, and sets a specific drive point of said internal combustion engine to attain output of a driving force corresponding to the driving force demand to said drive shaft, based on the driving force demand and a discharge limit of said electric accumulator, and controls said internal combustion engine, said electric power-dynamic power input-output module, and said motor to drive said internal combustion engine at the preset specific drive point and to ensure output of the driving force corresponding to the driving force demand to said drive shaft, wherein said controller calculates a first revolution speed of said internal combustion engine from a smoothed driving force, which is obtained by smoothing the driving force demand, and the discharge limit of said electric accumulator, and sets the calculated first revolution speed to a target revolution speed of said internal combustion engine at the specific drive point.

2. A hybrid vehicle in accordance with claim 1, wherein said controller sets the smaller between the first revolution speed and a second revolution speed to the target revolution speed of said internal combustion engine at the specific drive point, where the second revolution speed is obtained by smoothing a revolution speed of said internal combustion engine calculated from the driving force demand.

3. A hybrid vehicle in accordance with claim 1, wherein said controller sets the first revolution speed calculated from a first driving force, which is transmitted to said drive shaft through input and output of power from and to said electric power-dynamic power input-output module, to the target revolution speed of said internal combustion engine at the specific drive point, where the first driving force is obtained according to a specific relation that a sum of the first driving force and a second driving force, which is input and output between said motor and said drive shaft, is equal to the smoothed driving force obtained by smoothing the driving force demand and according to another specific relation that a sum of a first electric power input from and output to said electric power-dynamic power input-output module and a second electric power input from and output to said motor is equal to the discharge limit of said electric accumulator.

4. A hybrid vehicle in accordance with claim 3, wherein said controller substitutes a power input from and output to said electric power-dynamic power input-output module, which is calculated from the first driving force, into a target power of a relational expression, reversely calculates the relational expression to specify a target revolution speed, and sets the specified target revolution speed to the first revolution speed of said internal combustion engine, where the relational expression determines a target power to be input from and output to said electric power-dynamic power input-output module in feedback control of said electric power-dynamic power input-output module with the setting of the target revolution speed of said internal combustion engine.

5. A hybrid vehicle in accordance with claim 1, wherein said controller drives and controls said electric power-dynamic power input-output module under a driving condition specified to drive said internal combustion engine at the preset specific drive point, while driving and controlling said motor to output a specific driving force to said drive shaft, where the specific driving force corresponds to a difference between a driving force applied to said drive shaft by the actuation and the control of said electric power-dynamic power input-output module and the smoothed driving force obtained by smoothing the driving force demand in response to the driver's release of the accelerator.

6. A hybrid vehicle in accordance with claim 5, wherein said controller drives and controls said motor under restriction of the discharge limit of said electric accumulator.

7. A hybrid vehicle in accordance with claim 1, wherein said electric power-dynamic power input-output module comprises:
a three-shaft power input-output assembly that is connected with three shafts, that is, an output shaft of said internal combustion engine, said drive shaft, and a third shaft, and specifies input and output of power from and to one residual shaft among said three shafts, based on powers input from and output to two shafts among said three shafts; and
a generator that inputs and outputs power from and to said third shaft.

8. A hybrid vehicle in accordance with claim 1, wherein said electric power-dynamic power input-output module is a pair-rotor motor, which comprises a first rotor linked with an output shaft of said internal combustion engine and a second rotor linked with said drive shaft and outputs at least part of the power from said internal combustion engine to said drive shaft accompanied with input and output of electric power generated through an electromagnetic interaction between said first rotor and said second rotor.

9. A hybrid vehicle controlling method for a hybrid vehicle, said hybrid vehicle comprising: an internal combustion engine; an electric power-dynamic power input-output module that transmits at least part of power from said internal combustion engine to a drive shaft liked with drive wheels through input and output of electric power and dynamic power; a motor that inputs and outputs power from and to said drive shaft; and an electric accumulator that transmits electric power to and from said electric power-dynamic power input-output module and said motor, said hybrid vehicle controlling method comprising the steps of:
(a) in response to a driver's release of the accelerator requires a driving force demand to said drive shaft subsequent to the driver's actuation of the accelerator, setting a specific drive point of said internal combustion engine to attain output of a driving force corresponding to the driving force demand to said drive shaft, based on the driving force demand and a discharge limit of said electric accumulator; and
(b) controlling said internal combustion engine, said electric power-dynamic power input-output module, and said motor to drive said internal combustion engine at the preset specific drive point and to ensure output of the driving force corresponding to the driving force demand to said drive shaft,
wherein said step(a) calculates a first revolution speed of said internal combustion engine from a smoothed driving force, which is obtained by smoothing the driving force demand, and the discharge limit of said electric accumulator, and sets the calculated first revolution speed to a target revolution speed of said internal combustion engine at the specific drive point.

10. A hybrid vehicle controlling method in accordance with claim 9, wherein said step(a) sets the smaller between the first revolution speed and a second revolution speed to the target revolution speed of said internal combustion engine at the specific drive point, where the second revolution speed is obtained by smoothing a revolution speed of said internal combustion engine calculated from the driving force demand.

11. A hybrid vehicle controlling method in accordance with claim 9, wherein said step(a) sets the first revolution speed calculated from a first driving force, which is transmitted to said drive shaft through input and output of power from and to said electric power-dynamic power input-output module, to the target revolution speed of said internal combustion engine at the specific drive point, where the first driving force is obtained according to a specific relation that a sum of the first driving force and a second driving force, which is input and output between said motor and said drive shaft, is equal to the smoothed driving force obtained by smoothing the driving force demand and according to another specific relation that a sum of a first electric power input from and output to said electric power-dynamic power input-output module and a second electric power input from and output to said motor is equal to the discharge limit of said electric accumulator.

12. A hybrid vehicle controlling method in accordance with claim 11, wherein said step(a) substitutes a power input from and output to said electric power-dynamic power input-output module, which is calculated from the first driving force, into a target power of a relational expression, reversely calculates the relational expression to specify a target revolution speed, and sets the specified target revolution speed to the first revolution speed of said internal combustion engine, where the relational expression determines a target power to be input from and output to said electric power-dynamic power input-output module in feedback control of said electric power-dynamic power input-output module with the setting of the target revolution speed of said internal combustion engine.

13. A hybrid vehicle controlling method in accordance with claim 9, wherein said step(b) drives and controls said electric power-dynamic power input-output module under a driving condition specified to drive said internal combustion engine at the preset specific drive point, while driving and controlling said motor to output a specific driving force to said drive shaft, where the specific driving force corresponds to a difference between a driving force applied to said drive shaft by the actuation and the control of said electric power-dynamic power input-output module and the smoothed driving force obtained by smoothing the driving force demand in response to the driver's release of the accelerator.

14. A hybrid vehicle controlling method in accordance with claim 13, wherein said step(b) drives and controls said motor under restriction of the discharge limit of said electric accumulator.

* * * * *

UNITED STATES PATENT AND TRADEMARK OFFICE
CERTIFICATE OF CORRECTION

PATENT NO. : 7,328,091 B2
APPLICATION NO. : 10/786040
DATED : February 5, 2008
INVENTOR(S) : Akihiro Kimura Page 1 of 1

It is certified that error appears in the above-identified patent and that said Letters Patent is hereby corrected as shown below:

| Column | Line | |
|---|---|---|
| 4 | 2 | Change "liked" to --linked--. |
| 7 | 66 | Change "since" to --after--. |
| 9 | 31 | Change "$Nm2 \cdot Tm2tmp + Nm1 \text{-} Tm1tmp + Loss = Wout$ (3)" to --$Nm2 \cdot Tm2tmp + Nm1 \cdot Tm1tmp + Loss = Wout$ (3)--. |
| 11 | 13 | Change "$Tmax = (Wout - Tm1 * Nm1)/Nm2$ (9)" to --$Tmax = (Wout - Tm1 * \cdot Nm1)/Nm2$ (9)--. |
| 14 | 19 | Change "liked" to --linked--. |

Signed and Sealed this

Second Day of December, 2008

JON W. DUDAS
*Director of the United States Patent and Trademark Office*